United States Patent
Wang (10) Patent No.: US 10,516,633 B2
(45) Date of Patent: *Dec. 24, 2019

(54) METHOD, SYSTEM, AND STORAGE MEDIUM FOR MESSAGE PROCESSING

(71) Applicant: TENCENT TECHNOLOGY (SHENZHEN) COMPANY LIMITED, Shenzhen (CN)

(72) Inventor: Qi Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/007,314

(22) Filed: Jun. 13, 2018

(65) Prior Publication Data

US 2018/0295076 A1 Oct. 11, 2018

Related U.S. Application Data

(63) Continuation of application No. 14/735,134, filed on Jun. 10, 2015, now Pat. No. 10,021,045, which is a (Continued)

(30) Foreign Application Priority Data

Dec. 10, 2012 (CN) .......................... 2012 1 0528221

(51) Int. Cl.
*H04L 12/58* (2006.01)
*H04L 29/08* (2006.01)

(52) U.S. Cl.
CPC .............. *H04L 51/04* (2013.01); *H04L 51/16* (2013.01); *H04L 51/26* (2013.01); *H04L 67/36* (2013.01)

(58) Field of Classification Search
CPC ......... H04L 51/16; H04L 51/36; H04L 51/26; H04L 51/04
See application file for complete search history.

(56) References Cited

U.S. PATENT DOCUMENTS

| 6,907,447 B1 | 6/2005 | Cooperman et al. |
| 8,200,762 B2 | 6/2012 | Staats |
| (Continued) | | |

FOREIGN PATENT DOCUMENTS

| CN | 101605109 A | 12/2009 |
| CN | 102202102 A | 9/2011 |

*Primary Examiner* — Abdulkader M Alriyashi
(74) *Attorney, Agent, or Firm* — Anova Law Group, PLLC (57) ABSTRACT

The present disclosure is related to the field of communication technologies and provides a method, system, and storage medium for message processing. The method includes the following steps: configuring, by an initiator, a serial number for a message, and sending the message having the configured serial number to a target end; extracting, by the target end, a serial number of a message that a user chooses to reply to, and adding the serial number to a corresponding reply message; and displaying, by the initiator according to the serial number carried in the reply message, the reply message next to a message corresponding to the serial number carried in the reply message. In the present disclosure, the serial number is configured for each message, and the reply message is displayed next to the corresponding message according to the serial number carried in the reply message, thereby improving pertinence between a reply message and its original message.

12 Claims, 4 Drawing Sheets

Related U.S. Application Data continuation of application No. PCT/CN2013/088916, filed on Dec. 10, 2013.

(56) References Cited

U.S. PATENT DOCUMENTS

| | | | |
|---|---|---|---|
| 2006/0036740 A1* | 2/2006 | Hagale | G06Q 10/107 709/227 |
| 2008/0144784 A1* | 6/2008 | Limberg | G06Q 10/107 379/88.14 |
| 2008/0263157 A1 | 10/2008 | Bhogal et al. | |
| 2013/0097260 A1 | 4/2013 | Lee | |

\* cited by examiner

METHOD, SYSTEM, AND STORAGE MEDIUM FOR MESSAGE PROCESSING

RELATED APPLICATION

This application is a continuation application of U.S. patent application Ser. No. 14/735,134, filed on Jun. 10, 2015; and U.S. patent application Ser. No. 14/735,134 is a continuation of PCT Application No. PCT/CN2013/088916, filed on Dec. 10, 2013, which claims priority to Chinese Patent Application No. 201210528221.7, filed on Dec. 10, 2012, the entire content of all of which is incorporated by reference.

FIELD OF THE TECHNOLOGY

The present disclosure generally relates to the field of communication technology and, more particularly, relates to method, system, and storage medium for message processing.

BACKGROUND OF THE DISCLOSURE

An instant messaging (IM) system is supposed to be a system that can send and receive Internet messages instantly. By using the IM system, a user can send text messages and transmit image data to another user, or perform communication activities with another user, such as audio conversations or video conversations.

Currently, in the IM system, a user can have a one-to-one or many-to-many chat and send IM messages to each other. The sent IM messages are arranged from top to bottom according to a sending time. Messages that are sent later are sequentially arranged behind messages that are sent earlier.

In an IM process, a user A sends a message and usually obtains a reply message from a user B after waiting for several seconds. However, when the user B replies to a previous message, the user A may be entering a message about another topic. In this way, if the user B wants to reply to a certain message that is sent earlier by the user A, reply messages can only be arranged behind according to a time sequence, which cannot make a timely feedback to a chat message of the user A pertinently. Reply messages are easily to be flooded by subsequent messages, which causes that the IM is not sufficiently instant as desired, and brings obstacles to instant communication between users.

SUMMARY

Embodiments of the present invention provide a method, system, and storage medium for message processing, to solve one or more problems in the art that, because existing message content is arranged merely according to a time sequence of sent messages, the message content has poor pertinence and obstacles are brought to communication between users.

A message processing method is provided, and includes the following steps:

configuring, by an initiator, a serial number for a message, and sending the message having the configured serial number to a target end;

extracting, by the target end, a serial number of a message that a user chooses to reply to, and adding the serial number to a corresponding reply message; and displaying, by the initiator according to the serial number carried in the reply message, the reply message next to a message corresponding to the serial number carried in the reply message.

An embodiment of the present invention further provides a message processing system, including:

a message sending unit, configured to configure a serial number for a message, and send the message having the configured serial number to a target end;

a message replying unit, configured to extract a serial number of a message that a user chooses to reply to, and add the serial number to a corresponding reply message; and a message display unit, configured to display, according to the serial number carried in the reply message, the reply message next to a message corresponding to the serial number carried in the reply message.

A non-transitory computer readable storage medium is provided including a computer readable program stored thereon. When being executed, the computer readable program causes one or more processors to implement a message processing method, the method including:

configuring, by an initiator, a serial number for a message, and sending the message having the configured serial number to a target end;

extracting, by the target end, a serial number of a message that a user chooses to reply to, and adding the serial number to a corresponding reply message; and displaying, by the initiator according to the serial number carried in the reply message, the reply message next to the message corresponding to the serial number carried in the reply message.

In the embodiments of the present invention, a serial number is configured for a message, and a reply message is displayed next to a corresponding message according to the serial number carried in the reply message, thereby improving pertinence between a reply message and an original message, and avoiding that because the reply message is flooded by subsequent messages in a communication process, obstacles are brought to communication between users.

DESCRIPTION OF EMBODIMENTS

To make the objectives, technical solutions, and advantages of the present disclosure clearer, the following further describes the present disclosure in detail with reference to the accompanying drawings and the embodiments of the present invention. It should be understood that the specific embodiments described herein are only used to explain the present disclosure, rather than limiting the present disclosure.

In the embodiments of the present invention, content serial numbers are configured for messages sent by a user; reply messages are arranged according to content serial numbers carried in the reply messages; and the reply messages are displayed next to corresponding messages, thereby improving pertinence between messages.

In the embodiments of the present invention, the present disclosure is further described in detail by using receiving and sending of an IM message as an example. The present disclosure may further be applied to message receiving and sending in another manner such as receiving and sending of a short message service message in a mobile phone. The specific embodiments described herein are only used to explain the present disclosure, rather than limiting the present disclosure.

Figure 1:
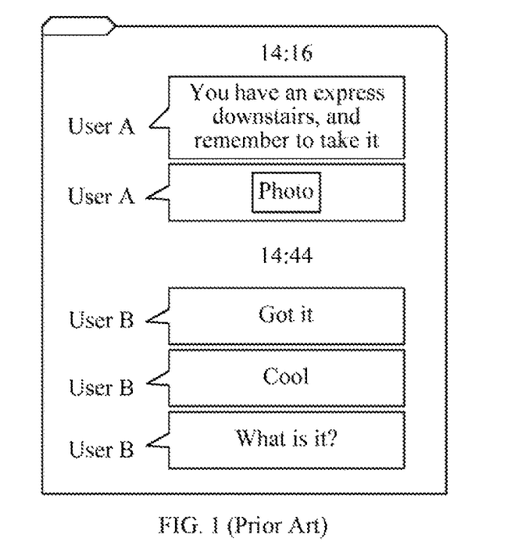
FIG. 1 illustrates a schematic diagram of an expression form of an IM dialog window according to the existing technology.

IM message content provided in the existing technology can only be arranged according to a time sequence. FIG. 1 illustrates a schematic diagram of an expression form of a dialog window according to the existing technology.

A user A sends to a user B a message "you have a parcel downstairs, and please pick it up" and a photo at 2:16 pm, and the user B does not reply. At 2:44 pm, the user B replies to the message sent by the user A, and the user B replies with "got it", "cool", and "what is it?".

In the existing technology, the message content sequentially arranged in a dialog window according to a time sequence is: "you have a parcel downstairs, and please pick it up", the photo, "got it", "cool", and "what is it?".

Actually, the user B replies to the message "you have a parcel downstairs, and please pick it up" with "got it", replies to the photo with "cool", and then further replies to the message "you have a parcel downstairs, and please pick it up" with "what is it?". The user B does not reply to the message of the user A in time, causing that dialog content lacks pertinence.

Figure 2:
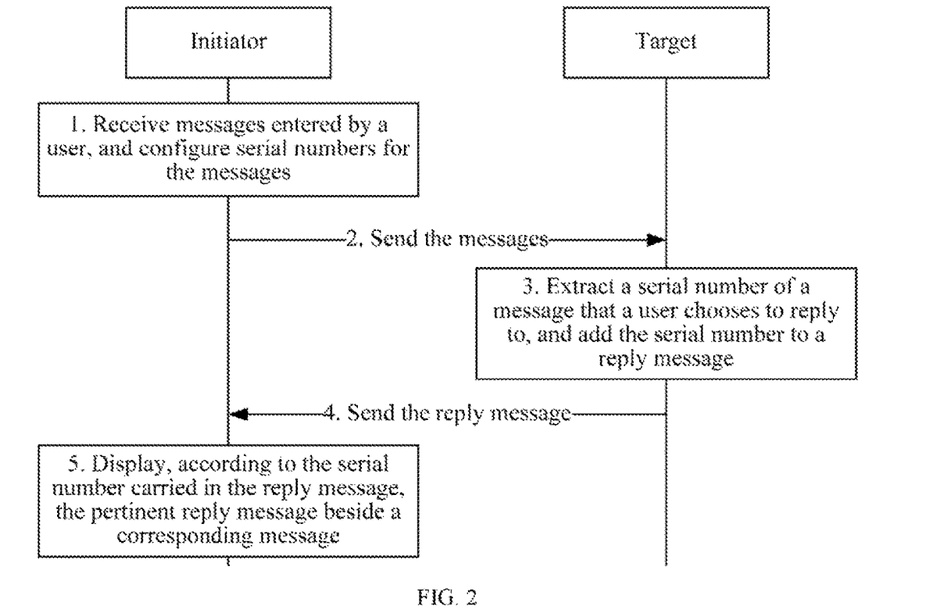
FIG. 2 illustrates an implementation flowchart of a message processing method according to an embodiment of the present invention.

FIG. 2 shows an implementation process of a message processing method according to an embodiment of the present invention, and detailed description is as follows.

Step 1: An initiator receives messages entered by a user and configures serial numbers for the messages.

In this embodiment of the present invention, the messages entered by the user may be numbered according to a time sequence, or the messages entered by the user may also be numbered in another manner. The serial numbers may be represented by using numbers and are arranged in an ascending order; or the serial numbers may also be represented by using other symbols. The specific embodiment described herein is only used to explain the present disclosure, rather than limiting the present disclosure.

Step 2: The initiator sends the messages having the configured serial numbers to a target end.

Step 3: The target end extracts a serial number of a message that a user chooses to reply to, and adds the serial number to a corresponding reply message.

In this embodiment of the present invention, a target end user may select, in multiple manners, the message that the user wants to reply to. For example, the user make a selection by clicking a message, which the user wants to reply to, on an IM interface or by entering a reply message in a blank dialog box carried in the message. The making a selection by clicking a message, which the user wants to reply to, on the IM interface may also be implemented in multiple manners. For example, the user may make a selection by performing a tap operation, a double-tap operation, or a touch and hold operation on a message, which the user wants to reply to, on the IM interface.

Step 4: The target end sends the reply message to the initiator.

Step 5: The initiator displays, according to the serial number carried in the reply message, the pertinent reply message next to a message corresponding to the serial number.

In this embodiment of the present invention, for the message content in FIG. 1, serial numbers A1, A2, B31, B42, and B51 are respectively configured for the messages "you have a parcel downstairs, and please pick it up", "photo", "got it", "cool", and "what is it?" according to the time sequence, where 1, 2, 3, 4, and 5 are message sequence numbers; A and B represent users; B31 represents a reply made by the user B to message content that has a content serial number of 1 and is sent by the user A; B51 represents a reply made by the user B to message content that has a content serial number of 1 and is sent by the user A; and B42 represents a reply made by the user B to message content that has a content serial number of 2 and is sent by the user A.

Figure 3:
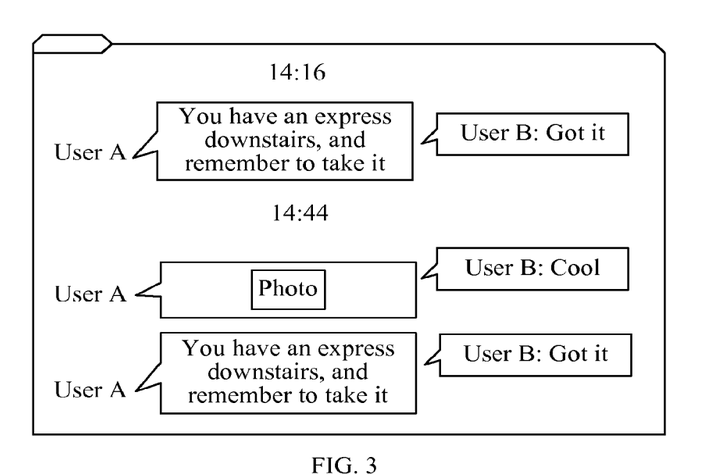
FIG. 3 illustrates a schematic diagram of a dialog window according to a first example of the present disclosure.

In this embodiment of the present invention, the pertinent reply messages are displayed next to corresponding messages according to the serial numbers, facilitating viewing of users. FIG. 3 illustrates a schematic diagram of a dialog window according to a first example of the present disclosure. A reply message "got it" that has a serial number of B31 and is made by the user B to message content "you have a parcel downstairs, and please pick it up" that has a content serial number of 1 and is sent by the user A is displayed next to the message "you have a parcel downstairs, and please pick it up"; a reply message "cool" that has a serial number of B42 and is made by the user B to message content "photo" that has a content serial number of 2 and is sent by the user A is displayed next to the photo. That is, according to the serial numbers, the reply message B31 is displayed next to the message A1, and the reply message B42 is displayed next to the message A2.

In this embodiment of the present invention, the displaying of the pertinent reply messages next to corresponding messages according to the serial numbers may be implemented in multiple manners. For example, a reply message regarding a message is displayed in a message box that is in 0.1 centimeter distanced from a right side of a message box of the message, or a reply message regarding a message is displayed in a message box that is 0.1 centimeter below a message box of the message, and there may also be another manner. The 0.1 centimeter mentioned herein is a set distance threshold, and the distance threshold may be set according to needs. In order to avoid misunderstanding, the message and the reply message regarding the message may also be differentiated by changing a font size and color of the pertinent reply message or in another manner.

As a preferred embodiment of the present invention, in order to enable users to instantly see the reply messages, the received reply messages and the corresponding messages are copied and displayed in a dialog window according to the time sequence of the reply messages.

As shown in FIG. 3, when the user B replies to the message A1 with the message B51, in order to instantly draw attention of the user A, a system first copies the message A1 and the reply message B31 regarding the A1 and displays the copied message A1 and B31 in the dialog window according to the time sequence, that is, the copied message A1 and the B31 are arranged behind the message B42. When the user B sends the reply message B51, the reply messages B31 and B51 are arranged according to the time sequence and are simultaneously displayed next to the message A1 and the copied message A1. At this moment, content shown in FIG. 3 becomes content shown in FIG. 4.

Figure 4:
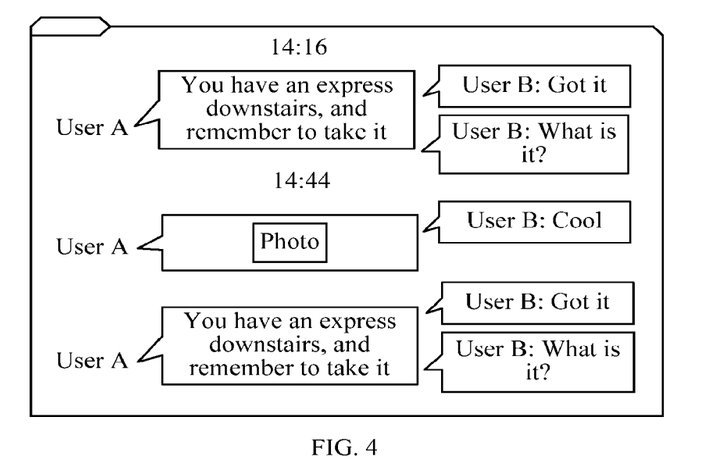
FIG. 4 illustrates a schematic diagram of a dialog window according to a second example of the present disclosure.

FIG. 4 illustrates a schematic diagram of a dialog window according to a second example of the present disclosure. As a preferred embodiment of the present invention, in order that the reply messages are checked by users more easily and ambiguity is avoided. When multiple reply messages regarding a certain message are received, the reply messages are displayed together and are arranged next to the corresponding message according to the time sequence, that is, the received multiple reply messages are arranged and displayed next to the messages corresponding to the serial numbers according to the time sequence and the carried serial numbers of the reply messages, as shown in FIG. 4.

As a preferred embodiment of the present invention, in order to avoid that the copied reply message causes troubles to users, when display time of the copied message and the pertinent reply messages next to the copied message reaches a set time threshold, such as 15 seconds, display of the copied message and the pertinent reply messages next to the copied message is cancelled. At this moment, content shown in FIG. 4 becomes content shown in FIG. 5.

Figure 5:
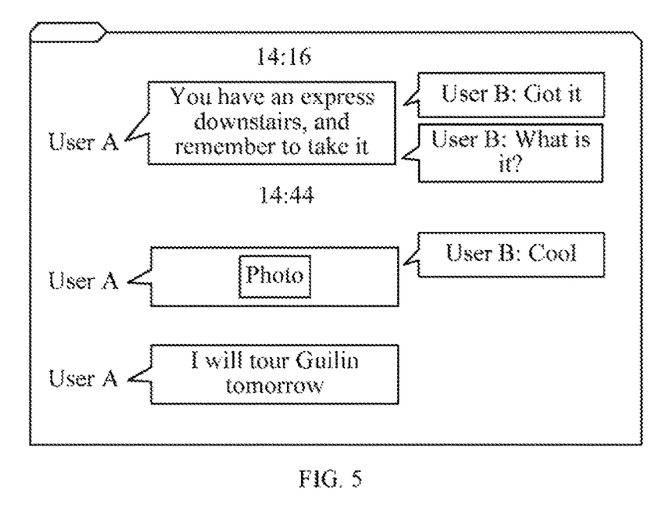
FIG. 5 illustrates a schematic diagram of a dialog window according to a third example of the present disclosure.

FIG. 5 illustrates a schematic diagram of a dialog window according to a third example of the present disclosure. In FIG. 5, a message "I will tour Guilin tomorrow" that has a serial number of A6 and is sent by the user A is not a reply to any foregoing message. The message is arranged in the dialog window according to the time sequence, that is, the message is arranged behind the photo and the reply message "cool" regarding the photo.

In this embodiment of the present invention, a reply message regarding a certain message is always displayed next to the message. For example, the message B31 is always displayed next to the message A1, that is, the B31 is always displayed next to a place in which the message A1 appears. When display time of the copied message A1 reaches a set threshold, display of the copied message A1, and display of the B31 and the B51 that are next to the copied message A1 are simultaneously cancelled.

Figure 6:
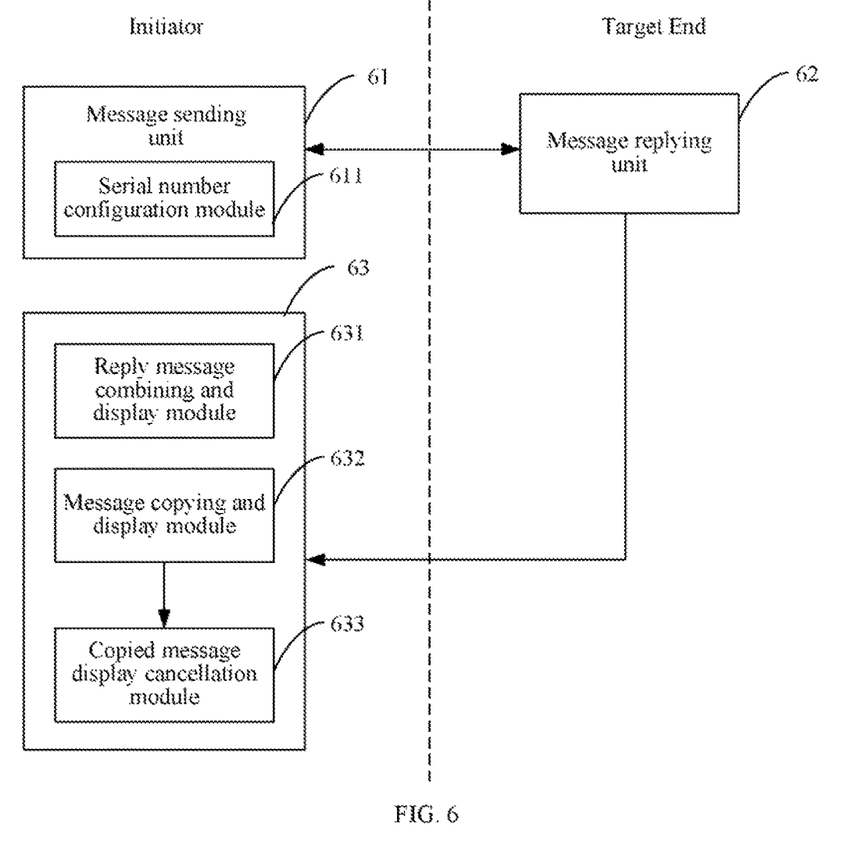
FIG. 6 illustrates a structural diagram of a message processing system according to an embodiment of the present invention.

FIG. 6 shows a structure of a message processing system according to an embodiment of the present invention. For the convenience of description, only a part related to this embodiment of the present invention is shown.

In this embodiment of the present invention, the message processing system includes a message sending unit 61, a message replying unit 62, and a message display unit 63.

The message sending unit 61 configures a serial number for a message according to a time sequence, and sends the message having the configured serial number to a target end.

The message replying unit 62 extracts a serial number of a message that a user chooses to reply to, and adds the serial number to a corresponding reply message.

The message display unit 63 displays, according to the serial number carried in the reply message, the reply message next to a message corresponding to the serial number carried in the reply message.

As an embodiment of the present invention, the message sending unit 61 includes a serial number configuration module 611. The serial number configuration module 611 configures the serial number for the message according to a time sequence.

As a preferred embodiment of the present invention, in order that the reply messages are checked by users more easily and ambiguity is avoided, when multiple reply messages regarding a certain message are received, the reply messages are displayed together and are arranged next to the corresponding messages according to the time sequence, that is, the received multiple reply messages are arranged and displayed next to the messages corresponding to the serial numbers according to the time sequence and the carried serial numbers of the reply messages.

In this embodiment of the present invention, the message display unit 63 includes a reply message combining and display module 631 and a message copying and display module 632.

The message combining and display module 631 arranges and displays, according to a time sequence and carried serial numbers of reply messages, the received multiple reply messages next to messages corresponding to the serial numbers.

As a preferred embodiment of the present invention, in order to enable users to instantly see the reply messages, the received reply messages and the corresponding messages are copied and displayed in a dialog window according to the time sequence.

The message copying and display module 632 copies, when a former message has a newer reply message than a later message, the former message and a reply message that is arranged next to the former message to the dialog window according to the time sequence of the reply messages.

As a preferred embodiment of the present invention, in order to avoid that the copied reply message causes troubles to users, when display time of the copied message and the pertinent reply messages reaches a set time threshold, such as 15 seconds, display of the copied message and the pertinent reply messages is cancelled.

As an embodiment of the present invention, the message display unit 63 further includes a display cancellation module 633. The display cancellation module 633 cancels, when a set time threshold is reached, display of a copied message and the corresponding reply message that is arranged next to the copied message.

It should be noted that in this embodiment of the present invention, the message sending unit 61 and the message display unit 63 are logically located in the initiator, and the message replying unit 62 is located in the target end. In an actual application, the message sending unit 61, the message display unit 63, and the message replying unit 62 are integrated in one system, so that a user uses the system when receiving and sending messages.

In this embodiment of the present invention, a serial number is configured for a message, and a reply message is displayed next to a corresponding message according to the serial number carried in the reply message, thereby improving pertinence between a reply message and an original message, and avoiding that because the reply message is flooded by subsequent messages in a process, obstacles are brought to instant communication between users.

A person of ordinary skill in the art may understand that all or some of the steps of the message processing method provided in the embodiments of the present invention may be implemented by a program instructing relevant hardware. The program may be stored in a computer readable storage medium. The storage medium includes a ROM/RAM, a magnetic disk, an optical disc, or the like. The hardware includes a computer, a server, various mobile devices, or the like.

For example, a non-transitory computer readable storage medium may include a computer readable program stored thereon. When being executed, the computer readable program may cause one or more processors in one or more computing devices to implement the disclosed method.

Figure 7:
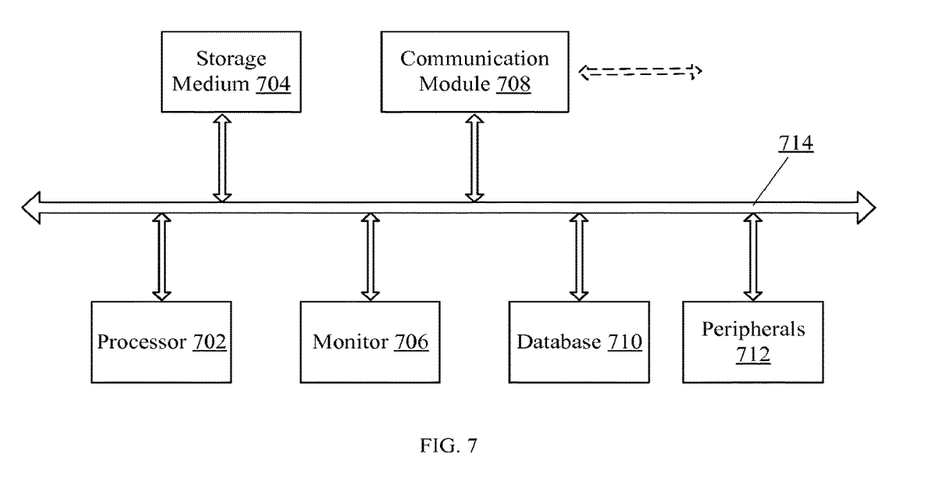
FIG. 7 illustrates an exemplary computing device consistent with the disclosed embodiments.

FIG. 7 illustrates an exemplary computing device capable of implementing the disclosed methods, consistent with the disclosed embodiments. As shown in FIG. 7, the exemplary computing device 700 may include a processor 702, a storage medium 704, a monitor 706, a communication module 708, a database 710, peripherals 712, and one or more bus 714 to couple the devices together. Certain devices may be omitted and other devices may be included.

Processor 702 may include any appropriate processor or processors. Further, processor 702 may include multiple cores for multi-thread or parallel processing. The processor 702 may be used to run computer program(s) stored in the storage medium 704. Storage medium 704 may include memory modules, such as ROM, RAM, and flash memory modules, and mass storages, such as CD-ROM, U-disk, removable hard disk, etc. Storage medium 704 may store computer programs for implementing various disclosed processes, when executed by processor 702. In one embodiment, storage medium 704 may be a non-transient computer-readable storage medium having a computer program stored thereon, when being executed, to cause the computer to implement the disclosed methods.

Further, peripherals 712 may include I/O devices such as keyboard and mouse, and communication module 708 may include network devices for establishing connections, e.g., through a communication network such as the Internet. Database 710 may include one or more databases for storing certain data and for performing certain operations on the stored data, such as webpage browsing, database searching, etc.

For example, the computing device may be included in the initiator and/or the target end, and may include the disclosed system. The computing device may be used to implement the disclosed methods.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A message processing method, implemented on an initiator that runs a messaging application, comprising:
sending, by the initiator, a plurality of outgoing messages to a target end, each having a corresponding serial number configured by the initiator;
displaying the plurality of outgoing messages in a dialog window of the messaging application according to a time sequence of the plurality of outgoing message;
receiving a first reply message from the target end, the first reply message carrying a first serial number corresponding to a first outgoing message that the target end selected to reply to;
displaying the first reply message next to the first outgoing message corresponding to the first serial number carried in the first reply message in the dialog window;
receiving a second reply message after receiving the first reply message, the second reply message carrying a second serial number corresponding to a second outgoing message, wherein the second outgoing message is sent to the target end prior to the first outgoing message;
displaying the second reply message next to the second outgoing message in the dialog window, wherein the second outgoing message and the second reply message are displayed and located above the first outgoing message in the dialog window;
automatically displaying a copy message of the second outgoing message and a copy reply message of the second reply message in the dialog window, wherein the copy message of the second outgoing message and the copy reply message of the second reply message are displayed next to each other and are displayed at a location below the first outgoing message in the dialog window, and wherein the second reply message is associated in content pertinence with the second outgoing message while a time delay exists between the second reply message and the second outgoing message; and
removing from the dialog window, when a set time threshold is reached, the copy message of the second outgoing message and the copy reply message of the second reply message.

2. The method according to claim 1, further comprising:
configuring, by the initiator, serial numbers for the plurality of outgoing messages according to the time sequence of the plurality of outgoing message.

3. The method according to claim 1, further comprising:
receiving a third reply message carrying the first serial number after receiving the first reply message; and
displaying the first reply message and the third reply message next to the first outgoing message in a chronological order.

4. The method according to claim 3, further comprising:
automatically displaying a copy message of the first outgoing message, a copy reply message of the first reply message, and a copy reply message of the third reply message in the dialog window, wherein the copy reply message of the first reply message and the copy reply message of the third reply message are arranged next to the copy message of the first outgoing message in the chronological order.

5. A message processing device, implemented on an initiator that runs a messaging application, comprising:
a memory; and
a processor coupled to the memory and configured to perform:
sending a plurality of outgoing messages to a target end, each having a corresponding serial number configured by the initiator;
displaying the plurality of outgoing messages in a dialog window of the messaging application according to a time sequence of the plurality of outgoing message;
receiving a first reply message from the target end, the first reply message carrying a first serial number corresponding to a first outgoing message that the target end selected to reply to;
displaying the first reply message next to the first outgoing message corresponding to the first serial number carried in the first reply message in the dialog window;
receiving a second reply message after receiving the first reply message, the second reply message carrying a second serial number corresponding to a second outgoing message, wherein the second outgoing message is sent to the target end prior to the first outgoing message;
displaying the second reply message next to the second outgoing message in the dialog window, wherein the second outgoing message and the second reply message are displayed and located above the first outgoing message in the dialog window;
automatically displaying a copy message of the second outgoing message and a copy reply message of the second reply message in the dialog window, wherein the copy message of the second outgoing message and the copy message of the second reply message are displayed next to each other and are displayed at a location below the first outgoing message in the dialog window, and wherein the second reply message is associated in content pertinence with the second outgoing message while a time delay exists between the second reply message and the second outgoing message; and removing from the dialog window, when a set time threshold is reached, the copy message of the second outgoing message and the copy reply message of the second reply message.

6. The device according to claim 5, wherein the processor is further configured to perform:

configuring serial numbers for the plurality of outgoing messages according to the time sequence of the plurality of outgoing message.

7. The device according to claim 5, wherein the processor is further configured to perform:

receiving a third reply message carrying the first serial number after receiving the first reply message; and displaying the first reply message and the third reply message next to the first outgoing message in a chronological order.

8. The device according to claim 7, wherein the processor is further configured to perform:

automatically displaying a copy message of the first outgoing message, a copy reply message of the first reply message, and a copy reply message of the third reply message in the dialog window, wherein the copy reply message of the first reply message and the copy reply message of the third reply message are arranged next to the copy message of the first outgoing message in the chronological order.

9. A non-transitory computer-readable storage medium containing one or more programs, wherein the one or more programs include instructions that, when being executed by a processor, cause the processor to perform:

sending a plurality of outgoing messages to a target end, each having a corresponding serial number configured by the initiator;

displaying the plurality of outgoing messages in a dialog window of the messaging application according to a time sequence of the plurality of outgoing message;

receiving a first reply message from the target end, the first reply message carrying a first serial number corresponding to a first outgoing message that the target end selected to reply to;

displaying the first reply message next to the first outgoing message corresponding to the first serial number carried in the first reply message in the dialog window;

receiving a second reply message after receiving the first reply message, the second reply message carrying a second serial number corresponding to a second outgoing message, wherein the second outgoing message is sent to the target end prior to the first outgoing message;

displaying the second reply message next to the second outgoing message in the dialog window, wherein the second outgoing message and the second reply message are displayed and located above the first outgoing message in the dialog window;

automatically displaying a copy message of the second outgoing message and a copy reply message of the second reply message in the dialog window, wherein the copy message of the second outgoing message and the copy reply message of the second reply message are displayed next to each other and are displayed at a location below the first outgoing message in the dialog window, and wherein the second reply message is associated in content pertinence with the second outgoing message while a time delay exists between the second reply message and the second outgoing message; and removing from the dialog window, when a set time threshold is reached, the copy message of the second outgoing message and the copy reply message of the second reply message.

10. The storage medium according to claim 9, wherein the instructions further cause the processor to perform:

configuring serial numbers for the plurality of outgoing messages according to the time sequence of the plurality of outgoing message.

11. The storage medium according to claim 9, wherein the instructions further cause the processor to perform:

receiving a third reply message carrying the first serial number after receiving the first reply message; and displaying the first reply message and the third reply message next to the first outgoing message in a chronological order.

12. The storage medium according to claim 11, wherein the instructions further cause the processor to perform:

automatically displaying a copy message of the first outgoing message, a copy reply message of the first reply message, and a copy reply message of the third reply message in the dialog window, wherein the copy reply message of the first reply message and the copy reply message of the third reply message are arranged next to the copy message of the first outgoing message in the chronological order.

* * * * *